United States Patent [19]

Langer

[11] Patent Number: 4,958,702
[45] Date of Patent: Sep. 25, 1990

[54] CONNECTING ARRANGEMENT FOR HORIZONTAL SCAFFOLDING SUPPORTS

[76] Inventor: Ruth Langer, Im Weinberg 13, D-7129 Gueglingen (Baden-Wuerttemberg), Fed. Rep. of Germany

[21] Appl. No.: 382,499

[22] Filed: Jul. 21, 1989

[30] Foreign Application Priority Data

Jul. 21, 1988 [DE] Fed. Rep. of Germany ....... 3824823

[51] Int. Cl.$^5$ .............................................. B66B 7/02
[52] U.S. Cl. ..................................... 187/95; 182/179; 403/49; 403/256; 52/638
[58] Field of Search .................... 187/95, 17, 8.59, 73, 187/92; 182/178, 179, 119, 222; 403/49, 246, 256, 284, 292, 398; 52/638, 645

[56] References Cited

U.S. PATENT DOCUMENTS 4,417,769 11/1983 Chelin .................................... 187/95
4,595,077 6/1986 Buttgereit ........................... 182/179

FOREIGN PATENT DOCUMENTS

0001164 4/1981 European Pat. Off. ............ 182/179
1163533 9/1969 United Kingdom ................ 182/179

Primary Examiner—H. Grant Skaggs
Assistant Examiner—Kenneth Noland
Attorney, Agent, or Firm—Antonelli, Terry, Stout & Kraus

[57] ABSTRACT

A span member for supporting scaffolding platforms in scaffolding using support posts that have perforated disks for mounting connecting heads. The span member includes a light-metal U-shaped beam with supporting edge webs on vertical legs thereof. The connecting head, shaped in many areas in a space saving manner and with a disk slot, includes welding flaps which abut inner surfaces of the vertical legs and are fastened thereto with a welded seam at the top.

5 Claims, 7 Drawing Sheets

CONNECTING ARRANGEMENT FOR HORIZONTAL SCAFFOLDING SUPPORTS

BACKGROUND OF THE INVENTION

The present invention relates to a connecting arrangement and, more particularly, to a connecting arrangement for horizontal scaffolding supports in scaffolding with vertical supports disposed at intervals corresponding to a grid system and including horizontal perforated disks.

Scaffolding of the aforementioned type generally includes a perforated disk on a support plate, with the perforated disk including holes into which the connecting heads of the scaffolding elements, serving as support structure, can be inserted with inserted wedges. The heads are generally designed to merge in wedge-like fashion by vertical side faces thereof and generally have, approximately at a horizontal center thereof, a disk slot for mounting on the perforated disks, as well as being provided in their upper and lower supporting parts with vertically continuous wedge openings.

Connecting structures for scaffolding elements have many different shapes designed to fit specific scaffolding systems and, for example, a connecting structure for scaffolding elements is proposed in Offenlengungsschrift No. 27 24 932.

In view of the great weight of steel components and the need to be able to erect and take down non-flammable scaffolding rapidly and easily even in constricted spaces, scaffolding made of lightweight material has been developed in many forms; however, the forces to be accommodated and supported at the connecting nodes of the scaffolding are so great that connecting heads made of steel have been used almost exclusively, with the connecting heads being linked to the scaffolding elements such as tubing and U-shaped beams by either pressed or shaped connections or by welded connections with the scaffolding elements.

As a result of the forces which must be taken into consideration, even light-metal tubes have developed considerable accumulations of weight at their ends making such light-metal tubes awkward to handle. Moreover, different materials with different properties always pose problems and, while the U-shaped span members have so far always been made of steel, it is desirable to have light-metal parts used throughout a light-metal scaffolding.

The aim underlying the present invention essentially resides in providing, for a span member made of a light metal, a connecting head of light metal which is capable of accepting and transmitting, under optimum conditions and forces that develop, has a suitable construction, is space and material saving, and which permits the connecting head to be welded to the light metal of the U-shaped beam with no adverse effects on the U-shaped beam if possible.

In accordance with the present invention, a connecting head is provided which is fashioned of the cast light metal and is constructed for a connecting area that is suitable for welding and fits a U-shaped beam of a span member, made of a light metal that a top thereof. An inwardly projecting welding flap is provided on the connecting head and is adapted to abut each wall of the U-shaped beam. A weld seam edge of the flap lies parallel beneath the supporting edge web and is reinforced and inwardly beveled at the bottom of the U-shaped beam. A head area abutting a lower horizontal web of the U-shaped beam includes a welding aid web extending into an interior of the U-shaped beam. A disk slot is tapered in an area of an inner base to a thickness of the disk, and shaped structures formed by depressions on the outer surfaces of the head include reinforcing edge areas adjacent to the wedge openings.

With U-shaped beams made of steel and steel heads, which, in practice, are welded to flaps as well, it is not important to be precise about an optimum design or construction of all areas of the head because the strength values of steel are considerably higher than that of light metal. Thus, in steel scaffolding constructions the welded seams can be arranged differently.

The present invention provides a construction for a light-metal in which the U-shaped beam includes an inwardly reinforced support edge web, on which hook-shaped suspension talons or clips of the scaffold platform can be used many times over a considerable number of years without resulting in any excessive wear. With the construction of the present invention, installation dimensions do not have to be changed from the corresponding dimensions in steel. Moreover, the inner lower edge of the supporting edge web along the upper edge area of the corresponding welding flap is constructed so that a receiving space is formed in which a suitable welded seam can be placed. More particularly, the space is formed so that a V-shaped seam can be placed thereat.

While the length of the welded flap depends upon the strength requirements and can be determined by a skilled artisan in the usual manner, while short flaps with vertical walls and edge walls are conventional in steel, a seam extending parallel to the supporting edge is provided in accordance with the present invention which allows more favorable acceptance of forces and is better suited to the requirements of light metal.

Moreover, consideration can also be given to the fact that the strength values of the light metal are reduced by a welding operation. In this situation, there is a relatively great distance to the supporting edge and the greatest weakening occurs at a certain distance from a maximum stress on the light metal so that a proper balance has been found. Otherwise, the head is welded only on the outside of the light-metal U-shaped beam.

Furthermore, by virtue of the features of the present invention, there is adequate support and accumulated material for suitable welding in a vicinity of the welding flaps. In a lower area of the connecting head, which abuts the horizontal web, no welded connection is provided on the inside thereby greatly simplifying manufacturing.

Additionally, due to the support of liquefied material during a welding from the outside, a formation of a so-called welding pool results and the present invention provides a welding aid web in the lower edge area at the head extending into an inner area of the U-shaped beam thereby offering optimum welding conditions thereat.

Additionally, with the subject matter of the present invention, the shape of the head is altered with respect to a similar head made of steel so that the outer area of the disk slot is made with a large amount of play, for example, several mm, that is usual for such scaffolding, so that the connecting heads will fit on properly, but the disk slot is made to taper in a direction toward the inner bottom portion thereof so that essentially it only has a very small amount of play, for example, for all practical purposes, equal to the thickness of the disk. This arrangement makes it possible for a greater accumulation of material in an area of maximum forces in the connecting head than in steel connecting heads of the same basic type thereby reducing the stress.

Additionally, according to the present invention, edge areas as well as the wedge openings, high stresses, and lower material strengths relative to steel are better adapted by the construction of the present invention and thus, with external dimensions in a top view for the connecting head made of steel, a horizontal support is created with a light-metal connecting head whose realization was not previously realized for lack of a suitable construction.

The favorable construction or arrangement of the present invention for welding light-metal parts makes it possible to do without any steel connecting head whose fastening for a light-metal U-shaped beam is possible only with a correspondingly large and long engaging portions and end areas of the span member. The provision of large and long engaging portions or fastening parts would block the space in which the talons or claws of ordinary scaffold platforms engage.

The above and other objects, features, and advantages of the present invention will become more apparent from the following description when taken in connection with the accompanying drawings, which show, for the purposes of illustration only, several embodiments in accordance with the present invention.

DETAILED DESCRIPTION

Figure 1:
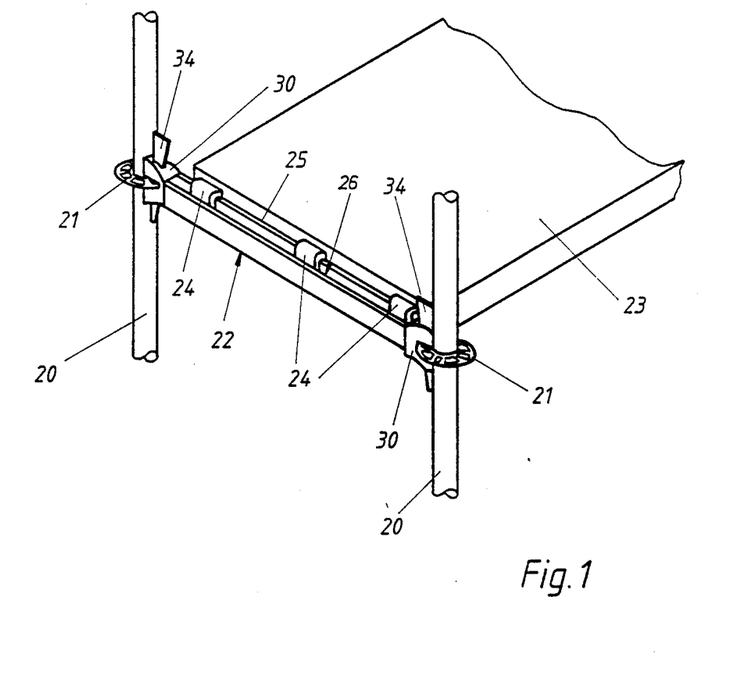
FIG. 1 is a perspective view of a portion of a scaffolding with span members and scaffold platforms suspended in place.

Referring now to the drawings wherein like reference numerals are used throughout the various views to designate like parts and, more particularly, to FIG. 1, according to this figure, a scaffolding includes vertical support posts 20 each having perforated disks 21 mounted thereon, with the vertical support posts 20 being spaced at a distance corresponding to a size of a grid. A span member generally designated by the reference numeral 22 is fastened between two support posts 20, with a scaffolding platform 23 resting on the span member 22 by suspension talons or claws 24 provided at side edges thereof. The talons or claws 24 rest, in a conventional manner, on a supporting edge 25 of a U-shaped beam generally designated by the reference numeral 26 of the span member 22. Conventional liftoff prevention means (not shown) provide protection against an inadvertent lifting off of the scaffolding platform 23.

Figure 3:
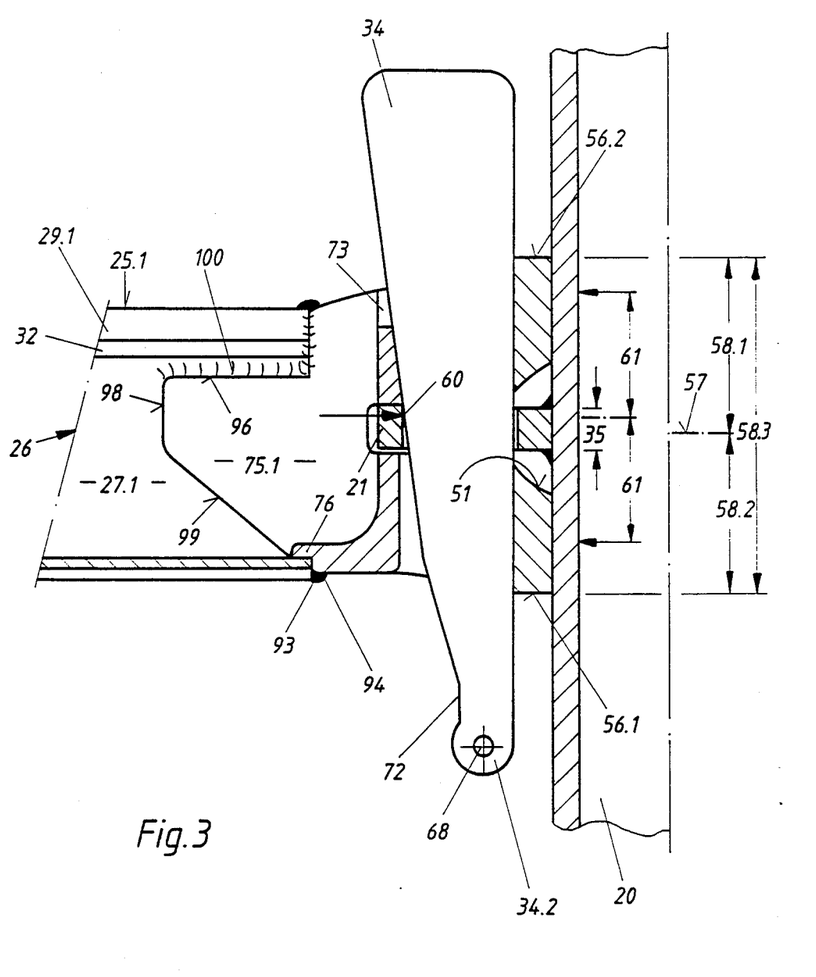
FIG. 3 is a vertical-sectional view taken along the line 3—3 in FIG. 2.
Figure 8:
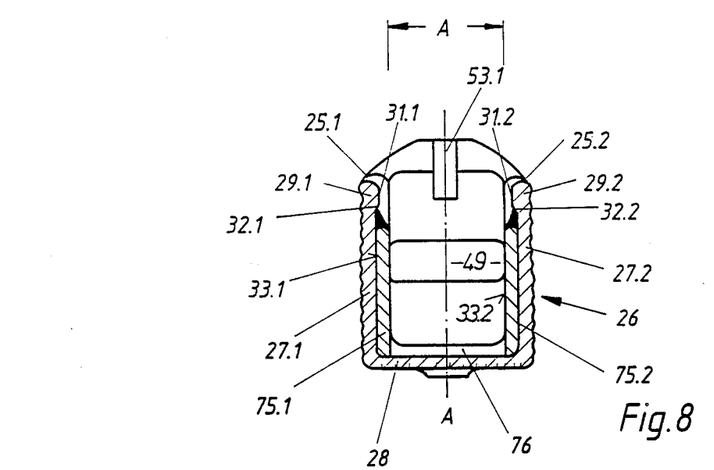
FIG. 8 is a cross-sectional view taken along the line 8—8 in FIG. 5.

The U-shaped beam 26, as shown in FIGS. 3 and 8, includes two vertical legs generally designated by the reference numerals 27.1, 27.2, with longitudinally extending exterior ribs and internal surfaces 33.1, 33.2 disposed at a distance A from each other. The vertical legs 27.1, 27.2 are connected by a lower horizontal 28. The entire U-shaped beam 26 is extruded as a light-metal section and, at an upper edge thereof, on both sides, are provided supporting edge ribs 29.1, 29.2 projecting inwardly and forming vertical walls 31.1, 31.2 merging tangentially with upper rounded edges 25.1, 25.2 and blending at a distance of a few mm with bevels 32.1, 32.2 into inner surfaces 33.1, 33.2 of the vertical legs 27.1, 27.2.

A connecting head generally designated by the reference numeral 30 is made entirely of a light metal and is manufactured by a suitable casting method, for example, by a sand-casting, gravity die casting, or pressure die-casting methods. The connecting head 30 includes a basic structure similar to that of conventional steel connecting heads; however, the individual shapes of the connecting head 30 are much more exactly adapted to stresses that appear and to strength values of light metal.

The connecting heads 30 have a standard configuration so that such connecting heads 30 may be used in a modular scaffolding system.

Figure 2:
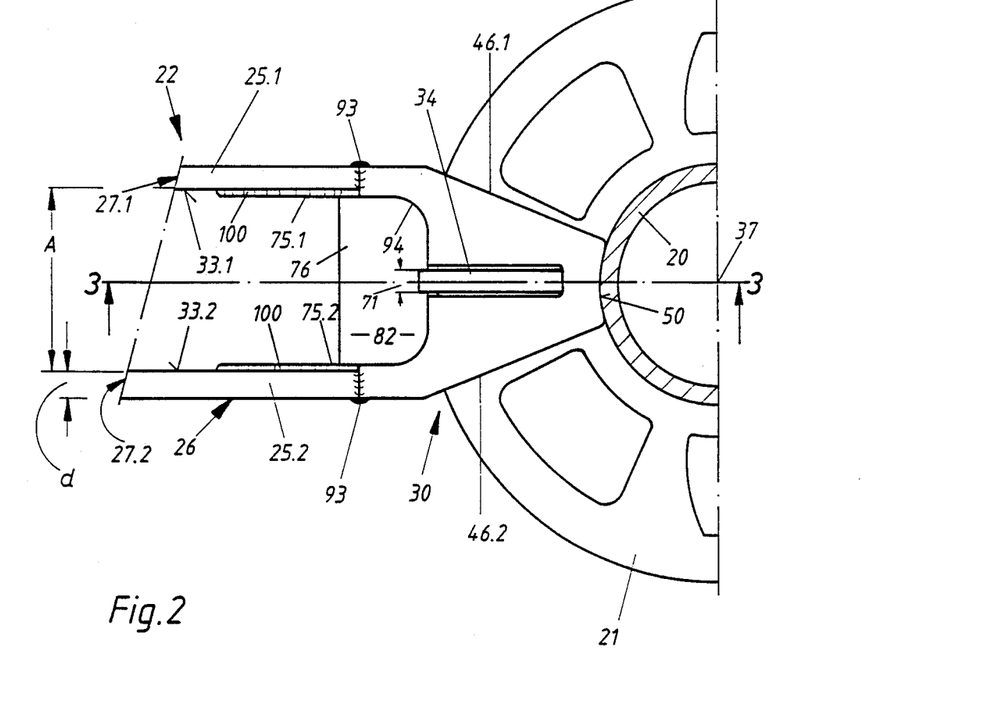
FIG. 2 is a partial cross-sectional top view of a span member connected to a perforated disk.
Figure 5:
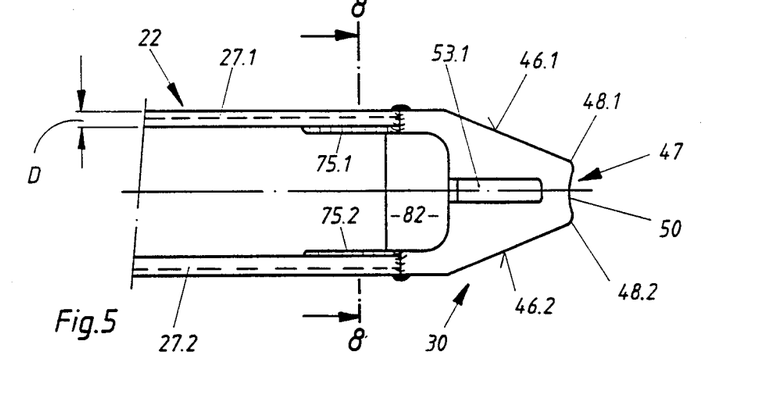
FIG. 5 is a top view of an end of the span member with the connecting head.
Figure 7:
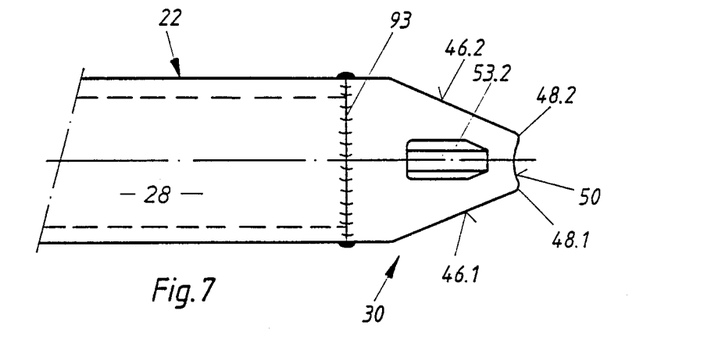
FIG. 7 is a lower view in a direction of an end of the span member with connecting head.

As shown in FIGS. 2, 5 and 7, side limits 46.1, 46.2 are wedge-shaped and taper toward the support posts 20 and disk center 37 so that eight connecting possibilities located immediately adjacent to one another are provided. Supporting surfaces 50 are curved concavely with a radius 47 of the outside wall of the support post 20 being, for example, 24 mm, and edge areas 48.1, 48.2 merge with rounding into the side limits 46.1, 46.2 so that there are no sharp-edged indentations in the wall of the tubes forming the support posts 20 which is particularly important for relatively soft light-metal material.

Figure 4:
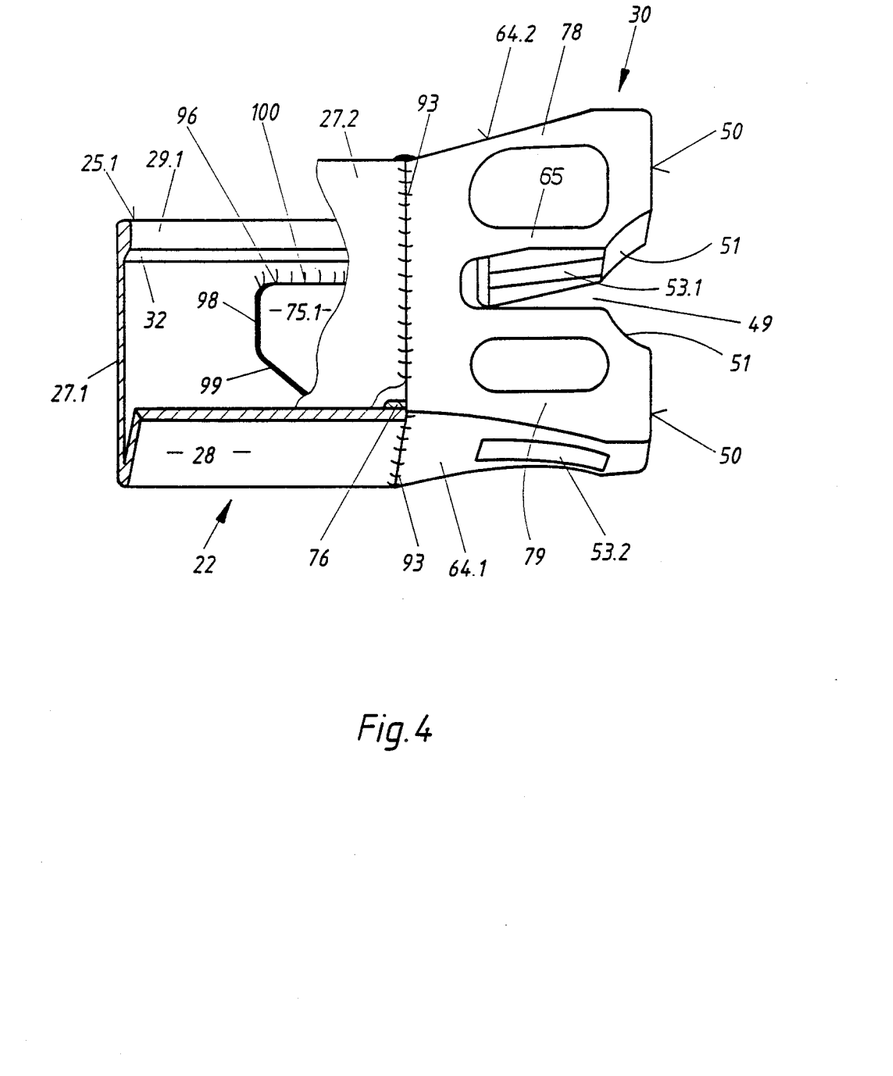
FIG. 4 is a fragmentary cross-sectional view of an end of a span member with the connecting head.
Figure 6:
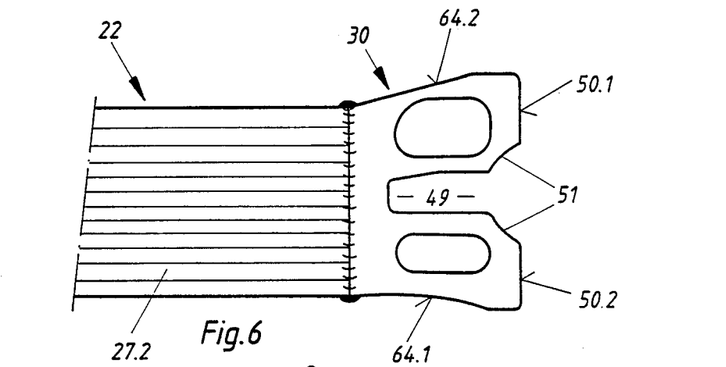
FIG. 6 is a side view of the end of the span member with the connecting head according to FIG. 5.

A horizontally extending disk slot 49 is formed outside with a height H1 (FIG. 9) of, for example, 13 mm, and blends with the supporting surface 50 by large-dimensioned rounded corners 51 (FIGS. 3, 4, 6). The disk slot 49 and the rounded corners or areas 51 interrupt the supporting surfaces 50 so as to divide the supporting surfaces 50 into two support areas 50.1, 50.2 shown most clearly in FIGS. 3, 4, 6, 9 and 11. The support areas 50.1, 50.2 abut a corresponding support post 20 on either side of a corresponding perforated disk 21

As shown in FIGS. 3, the heights of support areas 50.1, 50.2 of the supporting surface 50 are different, with the outer lower limit 56.1 of the supporting surface 50 being located at a distance 58.1 downwardly in FIG. 3 from a horizontal central plane 57 of the slot 49 while the outer limit 56.2 is located at a distance 58.2 upwardly from the horizontal central plane 57. Preferably, the distance 58.1 is 34 mm, and the distance 58.2 is 37 mm, resulting in a total height 58.3 of the supporting surface 50 of about 71 mm, whose center is displaced slightly upwardly relative to the horizontal central plane 57 resulting in approximately equal distances 61 to a wedge contact area 60 so that the applied moments act with equal lever arms and hence with approximately equal supporting forces on the tubing of the support posts 20 and the connecting head 30. Since the loads are both different and alternating, the arrangement is not an articulated connection or a rigid connection but rather a relatively elastic connection and is effective in several planes, into which the pretensioning forces are also directed. The dimensioning of the connecting arrangement is largely based on experience, trial, and some model calculations to arrive at optimum designs; however, the above-mentioned dimensions or distances meet the necessary requirements in a superb fashion in a connecting head 30 made of a light metal material.

Figure 9:
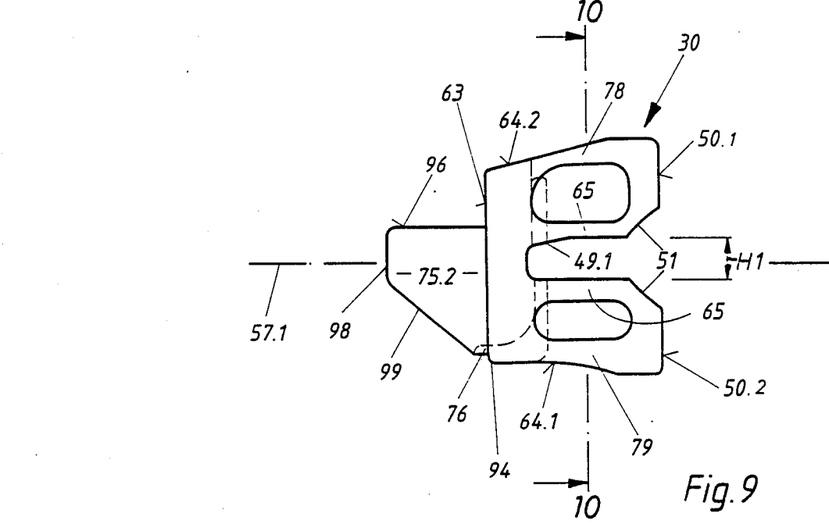
FIG. 9 is a side view of a connecting head.
Figure 11:
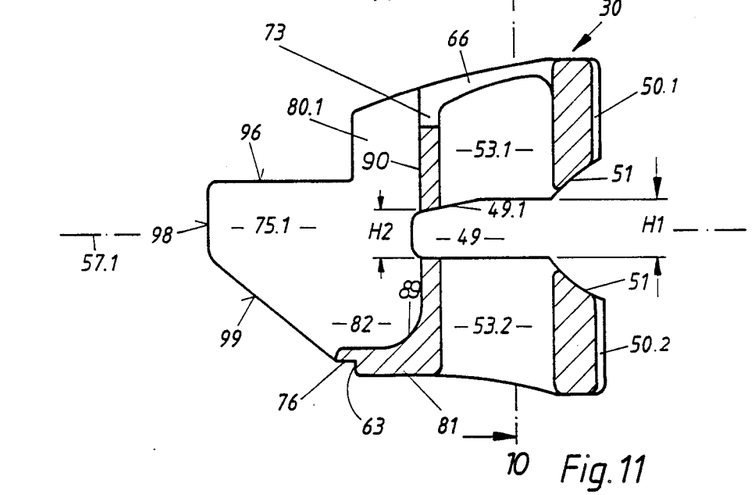
FIG. 11 is a vertical longitudinal cross-sectional view taken along the line 11—11 in FIG. 10.

While the forward support area of the connecting head 30 has an elongated rectangular shape, a rear connecting end face 63, as shown most clearly in FIGS. 9 and 11, advantageously has a wide U-shaped rectangular form matching the shape of the U-shaped span member 22. While the side limit lines 46.1, 46.2 (FIGS. 2, 7, 9) extend in a straight line wedge shape up to the connecting end face 63, the upper limit line 64.2 and lower limit line 64.1) FIGS. 4, 6, 9) are slightly curved so that the head is generally gradually reduced to a width and height of the welded elongated light-metal U-shaped beam 26. The lower limit line 64.1 is curved slightly concavely, and the upper limit line 64.2 is slightly convexly curved to receive a substantially straight wedge 34 (FIGS. 2, 3) to be placed parallel to the span member 22, with the rivet 68 (FIG. 3) being provided as a protection against loss.

Figure 10:
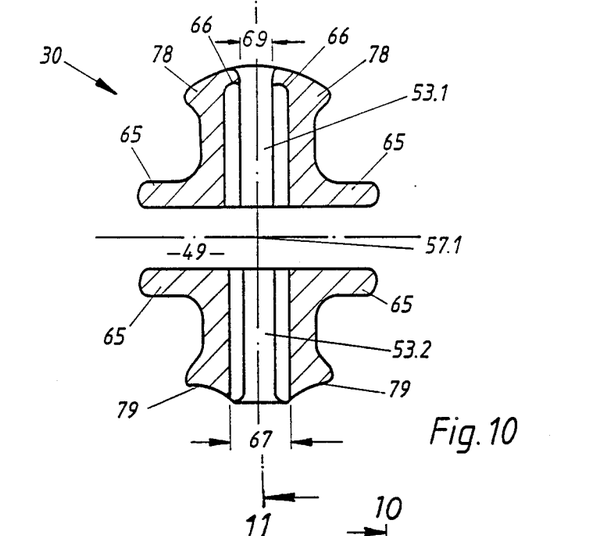
FIG. 10 is an enlarged vertical cross-sectional view taken along the line 10—10 in FIGS. 9 and 11.

As shown in FIG. 10, only flat leg 65 remains standing on either side of the disk slot 49, with the leg 65 running externally toward the limit lines 46.1, 46.2 and having a thickness of between approximately 5 mm and 8 mm. The legs 65 serve to limit the disk slot 49 and to secure the connecting head against rotation about a central axis 57.1 of the connecting end face 63 or U-shaped beam 26.

As shown in FIGS. 4, 5, 7, 10 and 11, vertically to the disk slot 49, wedge openings 53 extend through the connecting head 30 and have a width 67 (FIG. 10) up to the retaining ribs 66 that is slightly larger than the transverse extent of the rivet 68 (FIG. 3) of the wedge 34 so that the wedge 34 can be moved up and down in an easy manner. Between the retaining ribs 66, the wedge openings 53.1 have a width 69 (FIG. 10) that is greater than a thickness 71 of the wedge 34, but less than a length of the rivet 68, so that the rivet 68 serves as a protection against falling out while allowing the wedge 34 to be raised above the disk slot 49.

An end 34.2 (FIG. 3) of the wedge 34 is provided with an edge recessed portion or indentation 72 to allow insertion of the wedge 34 for transport approximately parallel to the span member 22, with the recess 73 being provided for this purpose in the top of the connecting head 30. In an area of the retaining ribs 66, beads 78 (FIGS. 4, 9, 10) which are initially small and grow larger toward the U-shaped beam 26, are provided externally. Corresponding outer beads 79 (FIGS. 4, 9, 10) are formed below on the connecting head 30. All four beads, 78, 79 are so constructed that sufficient cross sections are provided for a transfer of forces, but there are no surplus accumulations of material that increase the weight, and depressions are provided between the beads 78, 79 and the legs 65.

As shown in FIGS. 2-5, 9 and 11, the two welding flaps 75.1, 75.2 and welding aid web 76 (FIGS. 3, 4, 9, 11) are disposed interiorly of the connecting head 30 below and abutting the U-shaped connecting end face 63 opened at the top. The welding flaps 75.1, 75.2 have a distance from the outer edge 77.1, 77.2 of the connecting end face 63 inwardly, that corresponds to a thickness d (FIG. 2) of the side walls 27.1, 27.2, and of the horizontal web 28, and have a thickness D inwardly of approximately 3.5 mm to 4 mm, so that a wall thickness of approximately 8 mm results for the end walls 80.1 (FIG. 11), 80.2, and end web 81 (FIG. 11) of a connecting cavity 82 of the connecting head 30, with a thickness blending with rounded areas 89 into end wall 90 of the connecting head 30, offset by approximately 12 mm inwardly with respect to the connecting end face 63. The end wall 90, separated horizontally from the disk slot 49, separates the connecting cavity 82 and wedge openings 53.1, 53.2 thereby providing the entire connecting head 30 with high stability and strength despite the low weight thereof.

As shown in FIG. 11, in an area of the hole through end wall 90, the disk slot 49 is tapered to a dimension H2 by an inclined upper inner limit wall portion 49.1 so that the perforated disk 21 has just enough space and only a very small amount of play remains. In this area of high forces, the stresses are reduced by an increased accumulation of material. The disk slot 49 in an insertion area having a height H1 is sufficiently high to place the connecting head 30 lightly on the perforated disk 21.

As shown most clearly in FIGS. 3 and 4, the connecting head 30 with the connecting end face 63 abuts vertical legs 27.1, 27.2 of the U-shaped beam 26 cut off at right angles, and welded externally all the way around by an outer weld seam 93. Edges 92 of the supporting end faces 63 are designed with slightly rounded areas on an exterior surface thereof so that a small slightly V-shaped cavity is produced and a mixed form of a seam is formed between the V-shaped seam and the butt weld during a welding operation. Since welding flap 75.1, 75.2 abut internally directly against the inner surfaces 33.1, 33.2 (FIG. 8) of the vertical legs 27.1, 27.2 during welding, the liquified material is reliably supported. In any event, in the upper areas of the supporting edge webs 29.1, 29.2 there is enough material available to permit trouble free welding. The lower part of the outer seam 93 between the connecting head 30 and the horizontal web 28 is supported internally by the welding aid web 95 and protected against the liquified light metal running away by formation of a welding pool thereby allowing reliable welding with a minimum head stress.

As shown most clearly in FIGS. 3, 4, 9 and 11, the welding flap 75.1, 75.2 are formed with an upper horizontal welded seam edge 96 lying parallel below reinforced an inwardly beveled supporting edge webs 29.1, 29.2 (FIGS. 3, 8), so that a V-shaped receiving space is available for a suitable design for a V-seam. On the other hand, sufficient space is left relative to the upper support edge 25 so that the latter is not excessively weakened by the effects of heat. The end limits 98 of the welding flaps 75.1, 75.2 extend perpendicularly over only a portion of the height and extend into a diagonally lower edge 99 extending as far as the bottom of the U-shaped beam 26 formed by the horizontal web 28.

As best shown in FIG. 4, the end limit 98 and diagonal lower edge 99 are not fastened by welding. The easily applied welded seam 100, located at the top, is sufficient for internal fastening. Welding flap 75.1, 75.2 do not occupy any significant space inside the U-shaped beam 26, so that the suspension talons or claws 24 are not impeded in an area of the outer ends of the span members 22.

While I have shown and described several embodiments in accordance with the present invention, it is understood that the same is not limited thereto but is susceptible to numerous changes and modifications as known to one of ordinary skill in the art, and I therefore do not wish to be limited to the details shown and described herein, but intend to cover all such modifications as are encompassed by the scope of the appended claims.

I claim:

1. A connecting arrangement for horizontally support scaffolding platforms supported by spaced vertically extending support pole means each including a substantially horizontally disposed perforated disk means, and connecting head means for forming a scaffolding support releasably lockable on said perforated disk means, said connecting head means are fashioned of a cast-light metal material and include a connecting area substantially corresponding to an open area of a light metal U-shaped beam means forming a spanning member of the scaffolding, inwardly directed welding flap means are provided along an interior surface of the connecting head means for enabling a formation of a weld seam along a seam edge extending parallel to a supporting edge web means of the U-shaped beam means, said welding flap means being beveled inwardly at one end thereof and being adapted to abut a bottom surface of the U-shaped beam member for forming a reinforcement, a welding and web means provided on an area of the connecting head means abutting a lower horizontal web means of the U-shaped beam means, and disk slot means tapering in an area of an inner base portion thereof so as to have a thickness substantially corresponding to a thickness of the perforated disk means so as to enable the same to be accommodated in the disk slot means, and wherein reinforcing means are provided at least in an area of the disk slot means for reinforcing the connector head means.

2. A connecting arrangement according to claim 1, wherein said connecting head means further includes a plurality of wedge opening means for accommodating a locking wedge means to thereby enable a securing of the connector head means to the perforated disk means.

3. A connecting arrangement according to claim 2, wherein the reinforcement means includes portions of the connecting head means disposed between the disk slot means of the respective wedge opening means.

4. A connecting arrangement according to claim 3, wherein an outer surface of the connecting head means is formed with a plurality of spaced depressions.

5. A connecting arrangement according to claim 4, wherein the connecting head means terminate in a supporting surface divided by said disk slot means so as define two support areas, and wherein the support areas merge with said disk slot means by rounded areas.

* * * * *